United States Patent
Bourdon et al.

(10) Patent No.: US 8,130,258 B2
(45) Date of Patent: Mar. 6, 2012

(54) METHOD FOR PROCESSING A VIDEO SEQUENCE AND APPARATUS IMPLEMENTING SAID METHOD

(75) Inventors: Pascal Bourdon, Le Grand Fougeray (FR); Laurent Blondé, Thorigne-Fouillard (FR); Philippe Le Roy, Betton (FR)

(73) Assignee: Thomson Licensing, Issy-les-Moulineaux (FR)

( * ) Notice: Subject to any disclaimer, the term of this patent is extended or adjusted under 35 U.S.C. 154(b) by 1405 days.

(21) Appl. No.: 11/711,517

(22) Filed: Feb. 27, 2007

(65) Prior Publication Data
US 2007/0212024 A1    Sep. 13, 2007

(30) Foreign Application Priority Data
Mar. 1, 2006   (EP) .................................. 06290351

(51) Int. Cl.
*G06F 15/173* (2006.01)
(52) U.S. Cl. .......................................................... 348/31
(58) Field of Classification Search ............... 348/31; 382/162
See application file for complete search history.

(56) References Cited

U.S. PATENT DOCUMENTS

| | | | | |
|---|---|---|---|---|
| 6,813,040 | B1 * | 11/2004 | Uchino et al. | 358/1.9 |
| 7,444,075 | B2 * | 10/2008 | Yamashita | 396/222 |
| 7,630,020 | B2 * | 12/2009 | Fukuda | 348/650 |

FOREIGN PATENT DOCUMENTS

| | | |
|---|---|---|
| EP | 1 237 369 A2 | 9/2002 |
| EP | 1 345 428 A2 | 9/2003 |
| EP | 1 414 250 A | 4/2004 |
| FR | 2 859 857 A | 3/2005 |

OTHER PUBLICATIONS

European Search Report.

* cited by examiner

*Primary Examiner* — David Eng
(74) *Attorney, Agent, or Firm* — Myers Wolin, LLC

(57) ABSTRACT

The present invention is in the field of Content protection, most particularly in cinema venues where camcorder acquisition followed by immediate illegal distribution creates important revenue losses for content owners. It is known that anti-camcorder systems using a color modulation can be circumvented by using low shutter speed in the camcorder. Today, the shutter speed is determined automatically by the camcorder as a function of the filmed video source. In automatic configurations, shutter speed self-adapts to either motion, or flicker detection, both of which taking into account brightness variations only. The proposed invention proposes a dual color/brightness modulation to defeat automatic shutter speed adjustment. For example, a color modulation at 50/60 Hz is carried out and a brightness modulation at a higher frequency 100/120 Hz is added to force the camcorder to work at a high shutter speed.

12 Claims, 3 Drawing Sheets

METHOD FOR PROCESSING A VIDEO SEQUENCE AND APPARATUS IMPLEMENTING SAID METHOD

This application claims the benefit, under 35 U.S.C. §119 of European Patent Application 06290351.3, filed Mar. 1, 2006

FIELD OF THE INVENTION

The invention relates to a method for processing a sequence of video images within the context of an anti-camcorder system to reduce piracy in movie theatres and an apparatus for implementing said method.

BACKGROUND OF THE INVENTION

The visual contents, whether these are fixed or moving images, are in general creations that benefit from guarantees of exclusivity associated with the creator's rights. Their reproduction is in general permitted only within a strictly defined framework that allows the creators and their beneficiaries to be remunerated.

To ensure that these legal rules are complied with correctly, many systems have been developed to prevent illegal copies or to make the quality of the copies sufficiently degraded to make them unusable.

Within this context, the patent application EP 1 237 369 aims to combat the copying of images by means of a camera while they are being displayed, for example using a camcorder in a movie theatre. In this document, it has been proposed to modulate temporally the amplitude of the brightness of selected pixels representing an anti-piracy message around the value to be displayed at a high rate that makes the message invisible to the human eye but generates artefacts in the sequence filmed by the camcorder. Such a solution requires a modulation at a rate higher than the flicker frequency, which is of around 50 Hz, and therefore applies only to projection systems having a high image refresh rate, at least of around 100 Hz.

In the patent application WO 05/027529, it has been proposed to modulate the colour of the pixels instead of the brightness. This solution requires a modulation at a rate higher than the colour fusion frequency, which is of around 20 Hz as illustrated by FIG. 1.

The color modulation of the selected pixels is described in more detail hereinafter. The processing consists in doubling the frames of the input video, keeping the visual luminance (CIE1931 Y) constant while modifying the two other components (CIE1931 X and Z) in a way invisible to the human eye but affecting the camcorder vision. The two color components X and Z are modulated around the color value to be displayed in a way invisible to the human eye. Every input triplet $R_0G_0B_0$ describing the color of a pixel in the electric domain leads to the generation of two output triplets $R_1G_1B_1$ and $R_2G_2B_2$ which verify the following formulas in the CIE1931 XYZ color space:

$$\begin{cases} Y_1 = Y_2 = Y_0 \\ X_1 + X_2 = 2 \cdot X_0 \\ Z_1 + Z_2 = 2 \cdot Z_0 \end{cases} \quad (1)$$

Mathematically speaking, the relation (1) means that two modulated signals $X_m(t)$ and $Z_m(t)$ are generated based on $X_0$ and $Z_0$ values:

$$\begin{cases} X_m(t) = X_0(1 + \cos(2\pi f_m t)) \\ Z_m(t) = Z_0(1 + \cos(2\pi f_m t)) \end{cases} \quad (2)$$

where the modulation frequency $f_m$ equals 48 Hz for example and where the refresh frequency $f_r = 2f_m = 96$ Hz introduces a time-discretization ($\forall n \in \mathbb{N}$ $t = n/f_r$).

Applying $f_r$, $f_m$ and t properties to the equation (2), the following equation is obtained:

$$\begin{cases} X_m(t) = X_0(1 + \cos(n\pi)) \\ Z_m(t) = Z_0(1 + \cos(n\pi)) \end{cases} \quad (3)$$

The equation (3) holds the same properties as the equation (1) over a full period ($2\pi \to n = \{0,1\}$) with $X_1 = X_m(t)|_{n=0}$, $X_2 = X_m(t)|_{n=1}$, $Z_1 = Z_m(t)|_{n=0}$, and $Z_2 = Z_m(t)|_{n=1}$.

The equation (2) describes an amplitude modulation of the signals $X_0$ and $Z_0$ with a carrier sine wave of frequency $f_m$ (48 Hz in our example). Amplitude modulation (AM) is a well-known technique used in analog and digital communications to overcome signal transmission issues by shifting spectrums over high frequencies. In the present case, it allows to generate aliasing artifacts over camcorder acquisitions by increasing the bandwidth of the video signal. The additional constraint $Y_m(t) = Y_0$ is provided to ensure invisibility for a human eye, which is able to perceive brightness flicker at 48 Hz while it will not perceive color flicker.

The generation of colour artefacts by use of a camcorder is illustrated by FIGS. 2 to 4. This illustration is made only for the values $X_0$.

The values $X_0$ are supposed to be constant over a short time period. So the original spectrum of the signal $X_0$ can be depicted by FIG. 2. Amplitude modulation (AM) is a form of modulation in which the amplitude of a carrier signal changes depending on the amplitude of a modulating signal. A basic AM operation consists in multiplying the modulating signal, for example $X_0(t)$ with a carrier signal of frequency $f_m$ (in the present example, $f_m = 48$ Hz). The spectrum of the modulated signal $X_m(t)$ is shown at FIG. 3. The time discretization (present in both analog and digital cinemas) leads to a periodization of the resulting spectrum with a frequency $f_r = 96$ Hz as it can be seen on the upper left and right drawings of FIG. 4.

Since both of the modulation and discretization operations manage to keep extra spectral content out of the 0-48 Hz band (which includes the frequency band in which a human eye would tend to perceive colour flicker), the viewing audience will not notice anything abnormal when watching the modulated movie (lower left drawing on FIG. 4). A camcorder, however, would sample the modulated/discrete spectrum with a sample frequency of either $f_s = 50$ Hz (PAL standard: 50 interleaved frames per second) or $f_s = 60$ Hz (NTSC standard: 60 interleaved frames per second) which in both cases generate aliasing artefacts since the Nyquist-Shannon sampling theorem is not respected anymore ($f_s < 2f_m$). Because they appear inside the 0-20 Hz band, these artefacts would then be visible to the human observer, and disturb visualization of the illegally recorded video (lower right drawing on FIG. 4).

However, the actual colour modulation is not sufficient to defeat automatic shutter speed settings of recent camcorders. Indeed, in camcorder technology, the capturing/sampling process of a visual signal first requires its exposure to CCD/CMOS sensors for a certain amount of time. Exposure is also denoted as "shutter speed", although the shutter used in most video camcorders is not mechanical. Exposure time is the interval during which the CCD/CMOS sensors are exposed to incident light by the shutter, while integration time is defined as the interval during which the clocks of the camcorder are set to trap and retain charge. For a CCD, the integration starts when the CCD is cleared. It is counted from the end of clearing, until the CCD starts to read out. In the frequency domain, shutter could be compared to a low pass filter with exposure time being directly related to the cut-off frequency of the filter.

An issue with the new camcorders is the recent addition of automatic shutter speed adjustment. Auto-shutters measure brightness variations to readapt their own exposure time. As a result, when filming a movie screen, because variations hardly exceed 48 Hz (48 Hz in analog cinema with double-shuttering due to brightness flicker, or 12 Hz in flickerless digital cinema due to motion), the auto-shutter will tend to set exposure time to default values of 1/50 (PAL) or 1/60 (NTSC), thus behaving as a 50/60 Hz low pass filter and removing the colour modulation effect.

SUMMARY OF THE INVENTION

It is an object of the present invention to propose a method to prevent illegal copies in movie theatres and more particularly to defeat the automatic shutter speed adjustment of the recent digital video capturing devices.

To this end, it is proposed according to the invention a dual color/brightness modulation. An additional brightness modulation with a carrier frequency greater than the carrier frequency of the colour modulation is applied to pixels of the images to force the digital camcorder to work at a high shutter speed and to prevent it from removing the colour modulation effect by auto-shutter configurations.

The invention concerns a method for processing a sequence of video images comprising a color modulation step for modulating temporally the amplitude of the color of a first set of pixels of at least one image of the sequence around a color value to be displayed for said image, said color modulation being chosen to be not visible to the human eye while simultaneously generating artifacts due to aliasing when said video images are captured by a digital video capturing device. According to the invention, the method further comprises a brightness modulation step for modulating temporally the amplitude of the brightness of a second set of pixels of the image of the sequence around a brightness value to be displayed for said image, the modulation frequency of the brightness modulation step called brightness modulation frequency being selected to be substantially greater than the modulation frequency of the color modulation step, called color modulation frequency.

In a particular operation mode, the brightness modulation frequency is substantially equal to the frequency associated to a shutter speed of said digital video capturing device, for example 100 Hz for NTSC camcorders or 120 Hz for PAL camcorders.

The first set of pixels which color is modulated represents a warning message.

Preferably, the brightness modulation is applied to all the pixels of the images. In that case, the brightness modulation frequency can be chosen substantially equal to the refresh frequency of the display device used for displaying said sequence of video images and the brightness modulation can be made by turning off the display device at the end of each time period used for displaying an image.

The present invention concerns also an apparatus for displaying a sequence of video images represented by their video signals comprising a color modulation circuit for modulating temporally the amplitude of the color of a first set of pixels of each image of the sequence around a color value to be displayed for said image, said modulation being chosen to be not visible to the human eye while simultaneously generating artifacts due to aliasing when said video images are captured by a digital video capturing device, and a display circuit for displaying said modulated images on a screen. According to the invention, it further comprises a brightness modulation circuit for modulating temporally the amplitude of the brightness of a second set of pixels of each image of the sequence around a brightness value to be displayed for said image, the modulation frequency of the brightness modulation step called brightness modulation frequency being selected to be substantially greater than the modulation frequency of the color modulation.

BRIEF DESCRIPTION OF THE DRAWINGS

Exemplary embodiments of the invention are illustrated in the drawings and are explained in more detail in the following description. In the drawings.

DETAILED DESCRIPTION OF PREFERRED EMBODIMENTS

In order to defeat the self-adaptation of the shutter speed, it is proposed, in addition to the color modulation, to modulate the brightness of some pixels of the images with a carrier frequency higher than the color modulation frequency. Since the camcorder tries to synchronize its shutter speed to brightness variations, the additional brightness modulation will force the shutter to decrease its exposure time (i.e. increase the cut-off frequency of the shutter-related filter).

The carrier frequency of the brightness modulation (called brightness modulation frequency) has to be high enough to increase the shutter bandwidth and to ensure complete transmission of color modulation with a preference towards 100 Hz for NTSC camcorders and 120 Hz for PAL camcorders since automatic shutters are often conceived to synchronize with such frequencies. These shutter speeds are provided for avoiding disturbances coming from 50/60 Hz AC electric powered light sources like neon tubes.

For example, the color modulation frequency is equal to 50 Hz and the brightness modulation frequency is equal to 100 Hz. The brightness oscillations set the exposure time of the camcorder to 1/100. While synchronizing to 100 Hz variations, the resulting shutter configuration let the other 50 Hz color modulation effects go through and generate color artifacts once recorded.

As opposed to color modulation, this brightness modulation does not necessarily require a refresh frequency increase. It can be applied by turning off screen illumination over a short period of time at the end of each frame. Because its only purpose is to default exposure time self-adjustment of the camcorder, it does not require being applied to specific pixels unlike color modulation which is applied to some pixels for generating a warning message on the screen. So the brightness modulation can be applied to all pixels of the image or a part of them.

The brightness modulation can be synchronized with the refresh signal of the projection system. It can be carried out by turning off the displaying of the images for a very short period of time every frame, for example at the end of each frame.

Figure 1:
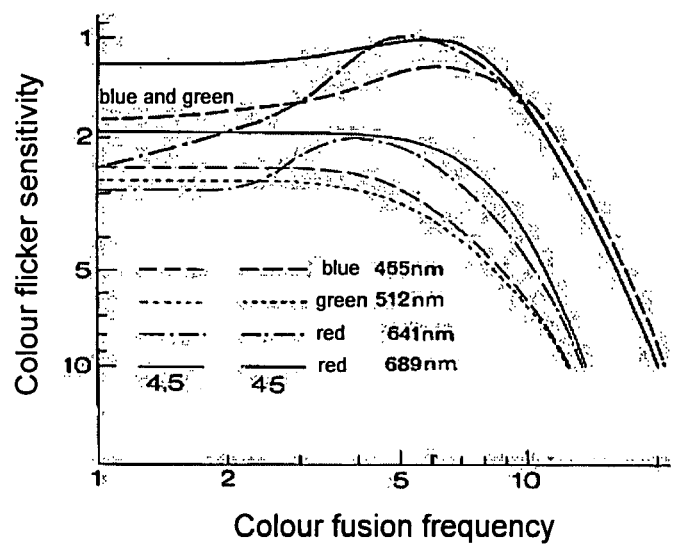
FIG. 1 is a diagram illustrating the color flicker sensitivity of the human eye.
Figure 2:
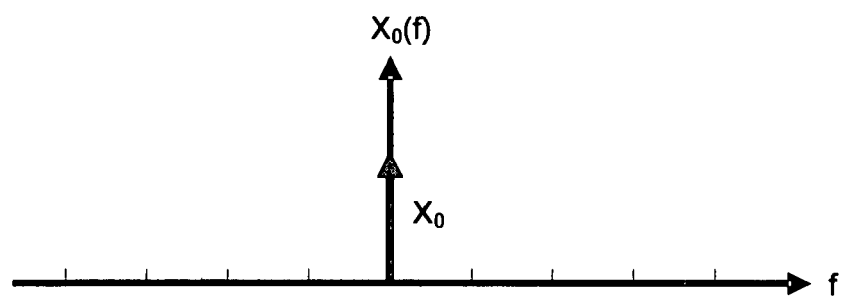
FIG. 2 shows the spectrum of a modulating signal.
Figure 3:
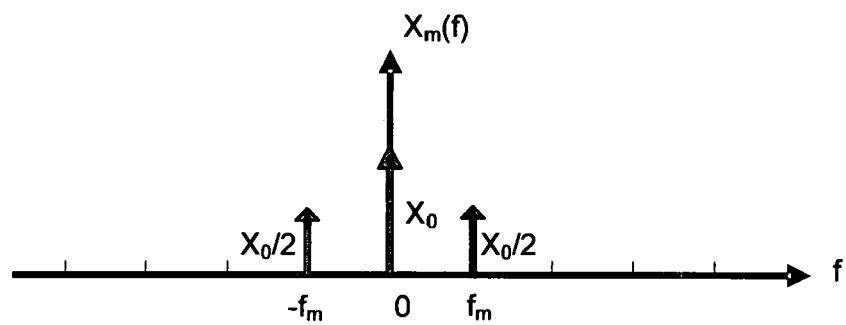
FIG. 3 shows of the spectrum of a modulated signal.
Figure 4:
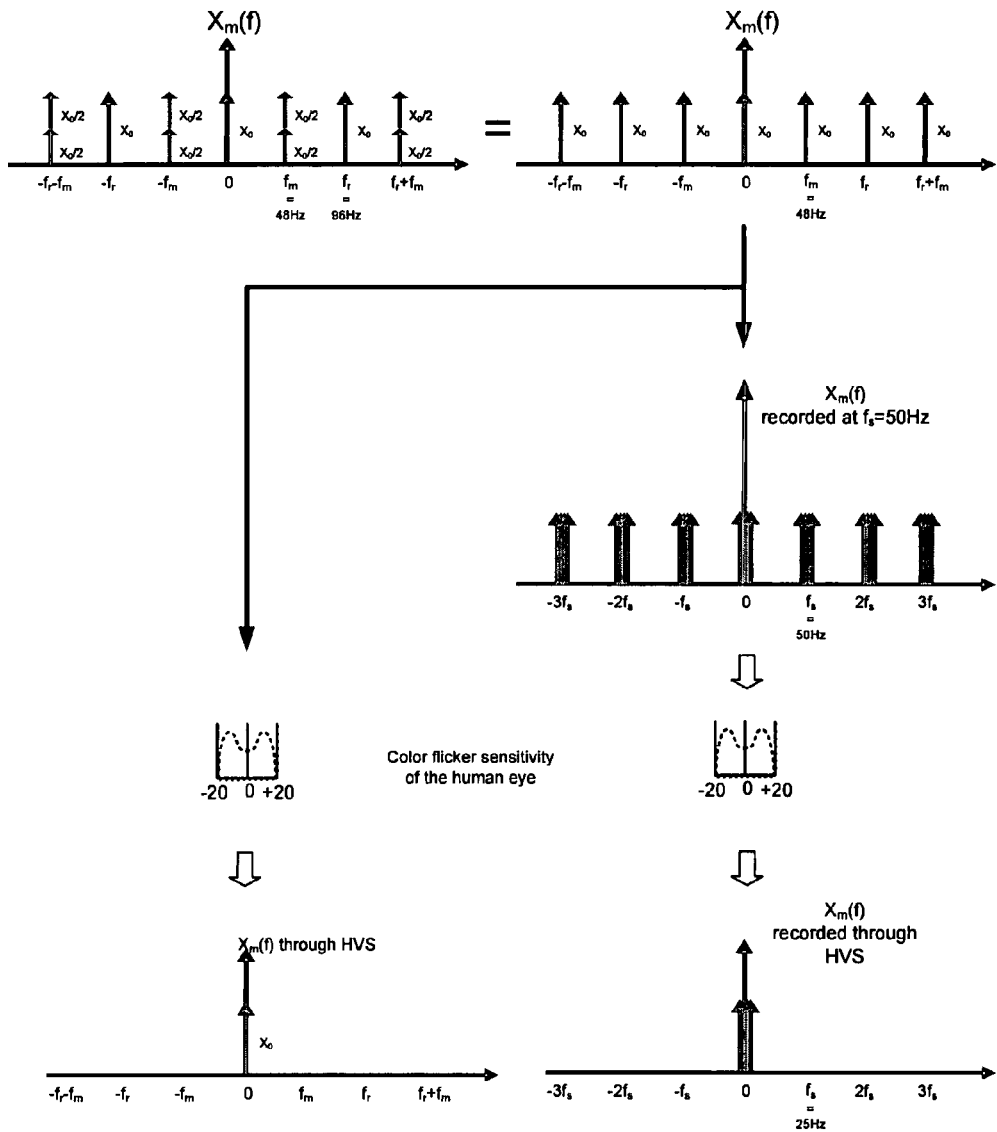
FIG. 4 shows a plurality of diagrams illustrating the artifacts generated when the video sequence is captured by a digital camcorder.
Figure 5:
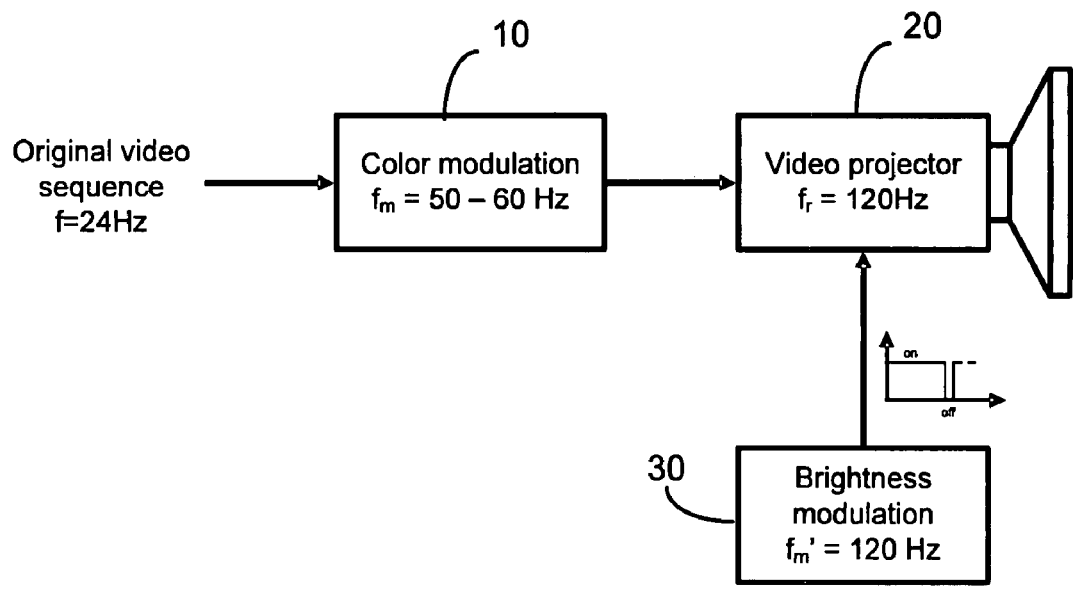
FIG. 5 shows a possible circuit implementation of the inventive method.

A possible circuit implementation of the inventive method is shown at FIG. 5. The 24 fps original video sequence is modulated in a color space, for example the YUV color space, at a frequency of 50 Hz (PAL) or 60 Hz (NTSC) or preferably at a frequency alternating between 50 Hz and 60 Hz throughout the sequence. This color modulation is implemented in a block 10. The modulated sequence is then forwarded to a projection system 20 having a refresh frequency of 120 Hz (120 Hz allows both 50 Hz and 60 Hz color modulation).

For a color value $P_0$ to be displayed, two color values $P_1$ and $P_2$ are computed using the full expression of the equation (2). If the color modulation frequency is not exactly half of the refresh frequency, for example if the color modulation frequency alternates between 50 Hz and 60 Hz and the refresh frequency is 120 Hz, $P_1$ or $P_2$ changes at every frame.

Figure 6:
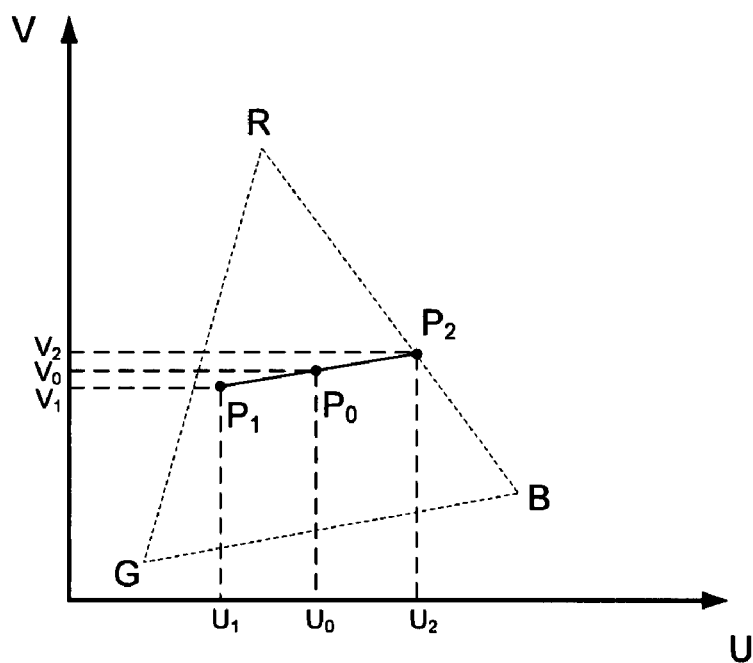
FIG. 6 illustrates the selection of two complementary color values used for color modulation.

FIG. 6 shows to symmetrical color values $P_1$ ($U_1,V_1$) and $P_2$ ($U_2,V_2$) compared with $P_0$ ($U_0,V_0$) in the YUV color space. $P_1$ and $P_2$ are preferably computed in order to find the maximum amplitude ($|U_2-U_1|,|V_2-V_1|$) to create a maximum anti-camcorder effect. Every point $P_n$ ($U_n,V_n$) for a given frame $t=n/f_r$ can be determined by the following formula:

$$P_n = P_0 + (P_1 - P_0)\cos(2\pi f_m t)) \qquad (4)$$

Since 120 Hz=5×24 Hz, every frame of the original sequence will be used to generate 5 modulated frames. Then, the modulated sequence is projected with a 120 Hz refresh rate and a synchronized pulse square modulation system 30 turns off the projection system for a very short period of time every $\frac{1}{120}$ seconds, for example at the end of every frame.

The invention claimed is:

1. Method for displaying a sequence of video images comprising:
    temporally modulating the amplitude of the color of a first set of pixels of at least one image of the sequence around a color value of said pixels to be displayed for said image,
    temporally modulating the amplitude of the brightness of a second set of pixels of said at least one image of the sequence around a brightness value of said pixels to be displayed for said image, wherein the modulation frequency of the modulated brightness is selected to be greater than the modulation frequency of the modulated color, and
    displaying said sequence using a display device,
    wherein the modulation frequency of the modulated color is chosen to be not visible to the human eye while simultaneously generating artifacts due to aliasing when said displayed sequence is captured by a digital video capturing device.

2. Method according to claim 1, wherein the modulation frequency of the modulated brightness is selected to be substantially equal to the frequency associated to a shutter speed of said digital video capturing device.

3. Method according to claim 1, wherein the modulation frequency of the modulated brightness is selected to be substantially equal to 100 Hz or 120 Hz.

4. Method according to claim 1, wherein the first set of pixels represents a warning message.

5. Method according to claim 1, wherein the second set of pixels is the entire image.

6. Method according to claim 5, wherein the modulation frequency of the modulated brightness is selected to be substantially equal to the refresh frequency of the display device used for displaying said sequence of video images.

7. Method according to claim 6, wherein said said temporally modulating the amplitude of the brightness is made by turning off the display device at the end of each time period used for displaying an image.

8. Apparatus for displaying a sequence of video images, wherein each pixel of said images are represented by video signals including color and brightness, comprising
    a color modulation circuit for temporally modulating the amplitude of the color of a first set of pixels of each image of the sequence around a color value of said pixels to be displayed for said image,
    a brightness modulation circuit for temporally modulating the amplitude of the brightness of a second set of pixels of each image of the sequence around a brightness value of said pixels to be displayed for said image, the modulation frequency of the modulated brightness being selected to be greater than the modulation frequency of the modulated color, and
    a display circuit for displaying said modulated images on a screen, wherein the modulation frequency of the modulated color is chosen to be not visible to the human eye while simultaneously generating artifacts due to aliasing when said displayed sequence is captured by a digital video capturing device.

9. Apparatus according to claim 8, wherein the first set of pixels represents a warning message.

10. Apparatus according to claim 8, wherein the second set of pixels is the entire image.

11. Apparatus according to claim 10, wherein the display circuit displays the modulated images on a screen at a refresh frequency and wherein the modulation frequency of the modulated brightness is selected to be substantially equal to said refresh frequency.

12. Apparatus according to claim 11, wherein the brightness modulation circuit turns off the display circuit at the end of each time period used for displaying an image.

* * * * *